United States Patent
Butlin et al.

(10) Patent No.: US 9,454,619 B2
(45) Date of Patent: *Sep. 27, 2016

(54) LAYERED USER INTERFACE

(75) Inventors: Stefan Geoffrey Butlin, Cambridge (GB); Nicholas Holder Clarey, Cambridge (GB); Nicholas Carl Brook, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 943 days.

This patent is subject to a terminal disclaimer.

(21) Appl. No.: 13/618,650

(22) Filed: Sep. 14, 2012

(65) Prior Publication Data

US 2013/0063479 A1    Mar. 14, 2013

Related U.S. Application Data

(63) Continuation of application No. 10/598,172, filed as application No. PCT/GB2005/000603 on Feb. 21, 2005, now Pat. No. 8,327,289.

(51) Int. Cl.
  *G06F 3/048*     (2013.01)
  *G06F 17/30*    (2006.01)
  *G06F 9/44*      (2006.01)
  *H04M 1/725*   (2006.01)

(52) U.S. Cl.
  CPC .......... *G06F 17/30905* (2013.01); *G06F 8/38* (2013.01); *G06F 8/71* (2013.01); *H04M 1/72563* (2013.01); *H04M 1/72525* (2013.01); *Y02B 60/188* (2013.01)

(58) Field of Classification Search
  None
  See application file for complete search history.

(56) References Cited

U.S. PATENT DOCUMENTS

| | | |
|---|---|---|
| 5,694,561 A | 12/1997 | Malamud et al. |
| 6,061,576 A | 5/2000 | Terrasson |
| 6,300,947 B1 | 10/2001 | Kanevsky |
| 6,392,640 B1 | 5/2002 | Will |
| 6,470,381 B2 | 10/2002 | De Boor et al. |
| 6,678,891 B1 | 1/2004 | Wilcox et al. |
| 6,717,593 B1 | 4/2004 | Jennings |
| 6,763,382 B1 | 7/2004 | Balakrishnan et al. |
| 6,791,587 B1 | 9/2004 | Bamford et al. |
| 6,850,255 B2 | 2/2005 | Muschetto |
| 6,901,441 B2 | 5/2005 | Bent et al. |
| 6,917,878 B2 | 7/2005 | Pechatnikov et al. |
| 6,954,652 B1 | 10/2005 | Sakanashi |
| 6,973,457 B1 | 12/2005 | Bastawala et al. |

(Continued)

FOREIGN PATENT DOCUMENTS

| | | |
|---|---|---|
| EP | 1052598 | 11/2000 |
| EP | 1193590 | 4/2002 |

(Continued)

OTHER PUBLICATIONS

3G Lab; Trigenix 2.0 Launch; "3G Lab Launches Trigenix 2.0 Mobile Interface"; http://web.archive.org/web/20030226014910/http://www.3g.co.uk/PR/Feb2003/4869.htm[Apr. 20, 2013 1:35:34 PM]; 4 pages.

(Continued)

*Primary Examiner* — Vanh Vu
(74) *Attorney, Agent, or Firm* — Espartaco Diaz Hidalgo

(57) ABSTRACT

A user interface for a device comprises a plurality of layers. The content for the user interface is associated with one of the plurality of layers.

40 Claims, 5 Drawing Sheets

(56) References Cited

U.S. PATENT DOCUMENTS

| | | |
|---|---|---|
| 6,993,362 B1 | 1/2006 | Aberg |
| 6,996,800 B2 | 2/2006 | Lucassen et al. |
| 7,010,758 B2 | 3/2006 | Bate |
| 7,113,981 B2 | 9/2006 | Slate |
| 7,219,305 B2 | 5/2007 | Jennings |
| 7,412,658 B2 | 8/2008 | Gilboa |
| 7,457,822 B1 | 11/2008 | Barrall et al. |
| 7,480,869 B2 | 1/2009 | Care |
| 7,496,645 B2 | 2/2009 | Yeung et al. |
| 7,500,198 B2 | 3/2009 | Mathews et al. |
| 7,543,235 B2 * | 6/2009 | Novak ................ G06F 8/38 715/234 |
| 7,900,186 B2 | 3/2011 | Lucassen et al. |
| 2002/0041292 A1 | 4/2002 | Son et al. |
| 2002/0063738 A1 | 5/2002 | Chung |
| 2002/0078143 A1 | 6/2002 | De Boor et al. |
| 2002/0109718 A1 | 8/2002 | Mansour et al. |
| 2002/0137502 A1 | 9/2002 | Cronin et al. |
| 2002/0151327 A1 | 10/2002 | Levitt |
| 2002/0196266 A1 | 12/2002 | Mou et al. |
| 2003/0013483 A1 | 1/2003 | Ausems et al. |
| 2003/0027592 A1 | 2/2003 | Hashimoto et al. |
| 2003/0084121 A1 | 5/2003 | De Boor et al. |
| 2003/0120667 A1 | 6/2003 | Jeong et al. |
| 2003/0158969 A1 | 8/2003 | Gimson et al. |
| 2003/0182626 A1 | 9/2003 | Davidov et al. |
| 2003/0200254 A1 | 10/2003 | Wei |
| 2003/0229441 A1 | 12/2003 | Pechatnikov et al. |
| 2003/0236917 A1 | 12/2003 | Gibbs et al. |
| 2004/0034853 A1 | 2/2004 | Gibbons et al. |
| 2004/0046789 A1 | 3/2004 | Inanoria |
| 2004/0061713 A1 | 4/2004 | Jennings |
| 2004/0075693 A1 | 4/2004 | Moyer et al. |
| 2004/0117439 A1 | 6/2004 | Levett et al. |
| 2004/0148586 A1 | 7/2004 | Gilboa |
| 2004/0158638 A1 | 8/2004 | Peters et al. |
| 2004/0177063 A1 | 9/2004 | Weber et al. |
| 2004/0216054 A1 | 10/2004 | Mathews et al. |
| 2004/0261031 A1 | 12/2004 | Tuomainen et al. |
| 2005/0021935 A1 | 1/2005 | Schillings et al. |
| 2005/0050474 A1 * | 3/2005 | Bells ................ G06F 8/38 715/747 |
| 2005/0057560 A1 | 3/2005 | Bibr et al. |
| 2005/0091576 A1 | 4/2005 | Relyea et al. |
| 2005/0108648 A1 * | 5/2005 | Olander ............ G06F 3/0482 715/744 |
| 2005/0108657 A1 | 5/2005 | Han |
| 2005/0216850 A1 | 9/2005 | Ramos et al. |
| 2005/0228871 A1 | 10/2005 | Zom et al. |
| 2005/0277432 A1 | 12/2005 | Viana et al. |
| 2007/0266316 A1 | 11/2007 | Butlin et al. |
| 2007/0283280 A1 | 12/2007 | Butlin et al. |
| 2007/0288856 A1 | 12/2007 | Butlin et al. |
| 2007/0300217 A1 | 12/2007 | Tunmer et al. |
| 2008/0037452 A1 | 2/2008 | Tunmer et al. |
| 2008/0153468 A1 | 6/2008 | Reilly |
| 2008/0282142 A1 | 11/2008 | Butlin et al. |

FOREIGN PATENT DOCUMENTS

| | | |
|---|---|---|
| EP | 1369842 | 12/2003 |
| GB | 2293951 | 4/1996 |
| GB | 2411331 A | 8/2005 |
| JP | 2003523697 A | 8/2003 |
| JP | 2003526960 A | 9/2003 |
| JP | 2003308145 A | 10/2003 |
| JP | 2012155728 A | 8/2012 |
| KR | 20010070863 A | 7/2001 |
| WO | 0014965 A1 | 3/2000 |
| WO | WO01042909 | 6/2001 |
| WO | WO0155889 | 8/2001 |
| WO | WO0161508 A1 | 8/2001 |
| WO | WO0195041 A1 | 12/2001 |
| WO | WO02093877 A1 | 11/2002 |
| WO | WO03067427 | 8/2003 |
| WO | WO03067527 A1 | 8/2003 |
| WO | WO03077140 | 9/2003 |
| WO | 2005081505 A1 | 9/2005 |
| WO | WO2007082190 | 7/2007 |

OTHER PUBLICATIONS

3G Lab; Trigenix 2.0 Launch; "3G Lab Launches Trigenix 2.0 Mobile Interface"; http://www.3g.co.uk/PR/Feb2003/4869.htm;4pages.

Aina, L., et al., "Growth of High Purity InP and Fabrication of High Sensitivity InP/GaInAs Heterojunction Phototransistors on Silicon by OMVPE" Online! XP000238840 Retrieved from the Internet: URL:http : www.msmobiles.com> 'Retrieved on Nov. 28, 2003! The whole document retrieved on May 18, 2005, pp. 118-121, Publication date is May 28, 2003.

Bailey E.C., "Maximum RPM—Taking the Red Hat Package Manager to the Limit" RPM Documentation, Jun. 1998 (1998-06), pp. 3-13, 16-18, 33, 52, 200, 237-239, XP002351753.

Bickmore T, et al., "Web Page Filtering and Re-Authoring for Mobile Users" Computer Journal, Oxford University Press, Surrey, GB, vol . 42, No. 6, 1999, pp. 534-546, XP000920338.

Edward Bailey, "Maximum RPM Taking the Red Hat Package Manager to the Limit", 2000.

European Search Report—EP10164186—Search Authority—Munich—Oct. 22, 2010.

File System Definition, accessed Mar. 11, 2010, 1 page.

International Search Report—PCT/GB2005/000627, International Search Authority—European Patent Office—Jun. 28, 2005.

International Search Report and Written Opinion—PCT/GB2005/000603, International Search Authority—European Patent Office—Sep. 1, 2005.

International Search Report and Written Opinion—PCT/GB2005/000610, International Search Authority—European Patent Office—Nov. 9, 2005.

International Search Report and Written Opinion—PCT/GB2005/000617, International Search Authority—European Patent Office—Jun. 23, 2005.

International Search Report and Written Opinion—PCT/GB2005/000630, International Search Authority—European Patent Office—Jun. 2, 2005.

International Search Report and Written Opinion—PCT/GB2005/000641, International Search Authority—European Patent Office—Jun. 3, 2005.

Marjan Hericko, et al., "Object Serialization Analysis and comparison in Java and .NET", ACM, Aug. 2003.

Microsoft Corporation: "Microsoft Windows 2000 Professional Resource Kit", Feb. 2, 2000, Microsoft Press, Redmond, XP002606217, ISBN: 1572318082, pp. 348-349.

Moors T, "The Smartphone:Interactive Group Audio With Complementary Symbolic Control" Lecture Notes in Computer Science, Springer Verlag, New Yor, NY vol. 2458 pp. 100-112 Apr. 3, 2002.

Sapiro M: "Re: setting executable bit on uploaded file—Message-ID: (38FC82EE.7C8C188C@value. net>" USENET Message, 'Online! (Apr. 18, 2000), XP002351754 comp.protocols.kermit.misc Retrieved from the Internet: URL:http://groups.google.com/group/comp.protocols.kermit.misc/msg/6d11eead89ed8efdmode=source&hl=en> 'retrieved on Oct. 28, 2005.

What's New in Brew Version 2.0, Dec. 4, 2002, 4 pages.

Written Opinion—PCT/GB2005/000627—ISA/EPO—Jun. 28, 2005.

* cited by examiner

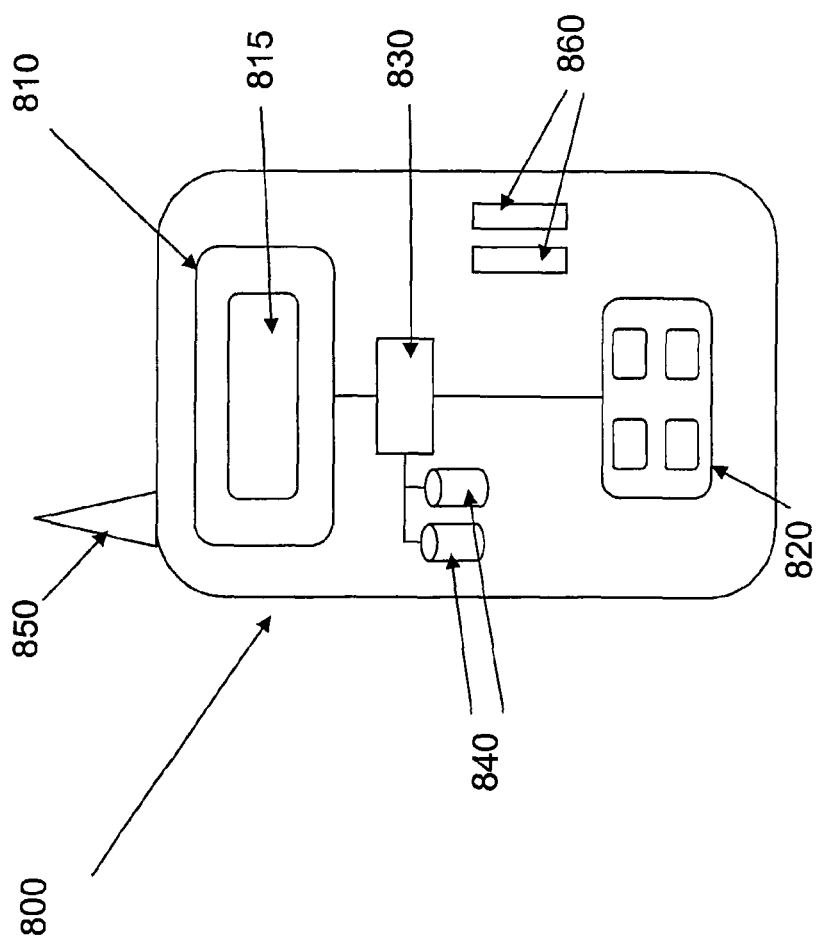

LAYERED USER INTERFACE

RELATED APPLICATIONS STATEMENT

This application is a continuation of and claims priority under 35 U.S.C. 120 to U.S. Non-Provisional application Ser. No. 10/598,172 entitled "LAYERED USER INTERFACE," filed on Jun. 4, 2007, which application is a National Stage Entry under 35 U.S.C. 371 of PCT/GB05/00603 entitled "LAYERED USER INTERFACE," filed on Feb. 21, 2005. The entire contents of these applications are hereby incorporated by reference.

FIELD OF THE INVENTION

The present invention relates to user interfaces and in particular to the user interface for devices for use with a mobile communications network.

BACKGROUND OF THE INVENTION

There is now a significant market in downloading images, ringtones, wallpapers, etc., to enable users to modify the appearance of their mobile phones. For commercial reasons it is desirable for mobile network operators and/or content providers to be able to have some control over the user interface that will be displayed on the screen of a mobile device. Conventional methods for implementing user interfaces lack the flexibility and configurability that enable such schemes to be implemented.

SUMMARY OF THE INVENTION

According to a first aspect of the present invention, there is provided a method of generating a user interface for a device, the method comprising the steps of: (a) generating a plurality of sets of user interface elements, each of the plurality of sets of user interface elements comprising one or more user interface elements, wherein the or each user interface element is associated with a defined region of the user interface; (b) ordering each of the plurality of sets of user interface elements into an sequence; (c) querying each of the plurality of sets of user interface elements to select a plurality of user interface elements for use in the user interface, the sets being queried in accordance with the ordering performed in step (b), wherein if more than one user interface element is associated with the same region of the user interface then the selected user interface element is taken from the set of elements which occurs first within the sequence determined in step (b); and (d) rendering the user interface in accordance with the plurality of user interface elements selected in step (c).

According to a second aspect of the present invention, there is provided a device comprising a display means and a user interface being displayed by the display means, the device being configured, in use, to: (a) generate a plurality of sets of user interface elements, each of the plurality of sets of user interface elements comprising one or more user interface elements, wherein the or each user interface element is associated with a defined region of the user interface; (b) order each of the plurality of sets of user interface elements into an sequence; (c) query each of the plurality of sets of user interface elements to select a plurality of user interface elements for use in the user interface, the sets being queried in accordance with the ordering performed in step (b), wherein if more than one user interface element is associated with the same region of the user interface then the selected user interface element is taken from the set of elements which occurs first within the sequence determined in step (b); and (d) render the user interface in accordance with the plurality of user interface elements selected in step (c).

According to a third aspect of the present invention, there is provided a data carrier comprising computer executable code for performing any of the above-described methods.

BRIEF DESCRIPTION OF THE DRAWINGS

FIG. 5 shows a schematic depiction of a device that comprises a user interface according to an embodiment of the present invention.

DETAILED DESCRIPTION OF THE INVENTION

Figure 1:
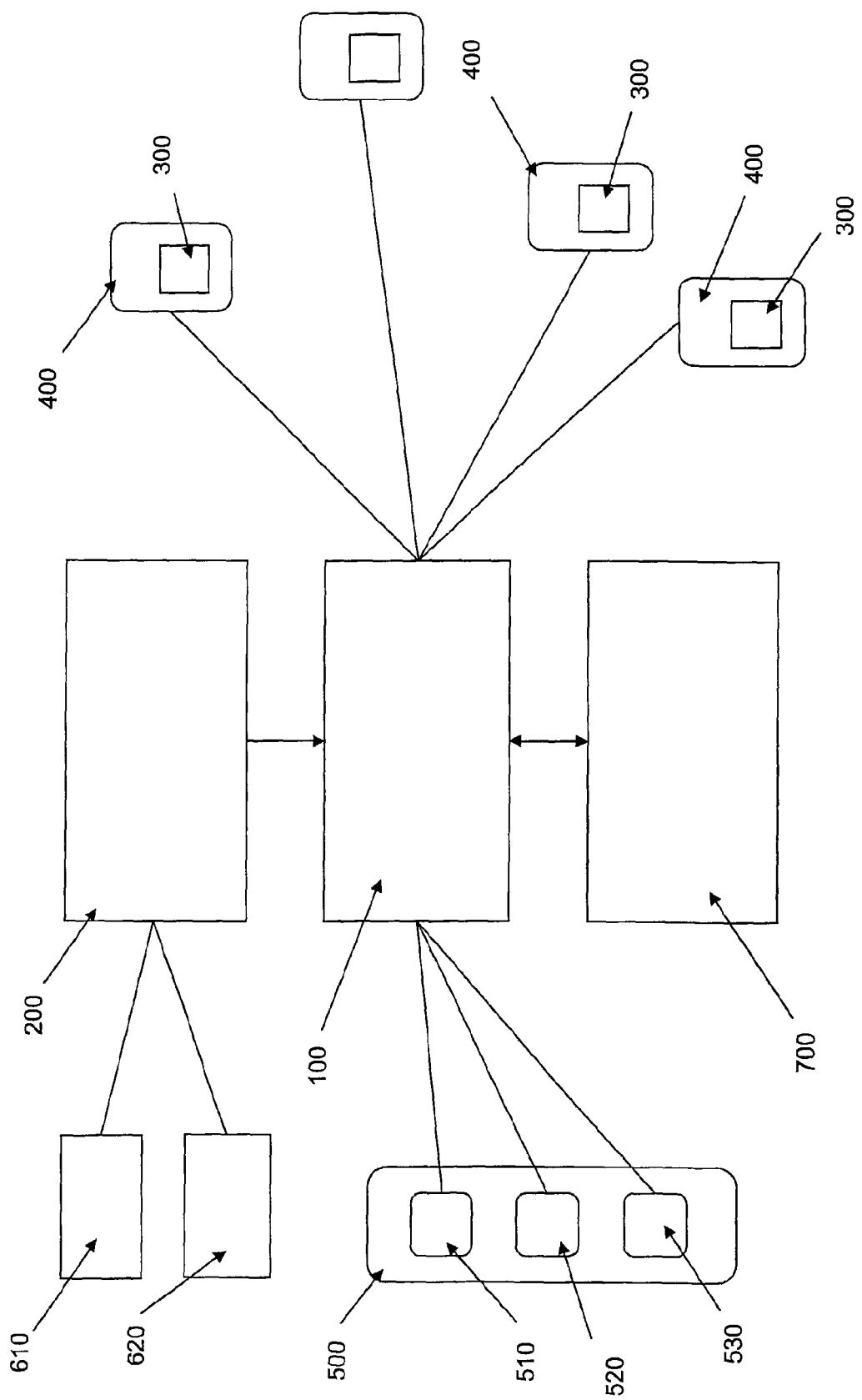
FIG. 1 shows a schematic depiction of a system incorporating the present invention.

The invention will now be described by way of illustration only and with respect to the accompanying drawings, in which FIG. 1 shows a schematic depiction of a system incorporating the present invention. The system comprises server 100, content toolset 200, mobile devices 300, operational support systems (OSSs) 700, content feeds 500 and user interface (UI) sources 600. In use, the server 100 communicates content data and UI data to the mobile devices 300, 301, . . . , each of which comprise software package 400. The server 100 interfaces with OSSs 700, with the OSSs being those conventionally used to operate mobile networks, for example billing, account management, etc. The server 100 further interfaces with the content toolset 200: the content toolset receives data from UI sources 600, 601, . . . , and packages the UI data such that the server can transmit the packaged UI data to the software packages 400 comprised within the mobile devices 300. The server receives data from a plurality of content feeds, and this data is processed and packaged such that it can be sent to the software packages 400 or so that the mobile devices 300 can access the data using the software package 400.

The system can be envisaged as being divided into three separate domains: operator domain 50 comprises the systems and equipment operated by the mobile network operator (MNO); user domain 60 comprises a plurality of mobile devices and third-party domain 70 comprises the content feeds and UI feeds that may be controlled or operated by a number of different entities.

Figure 2:
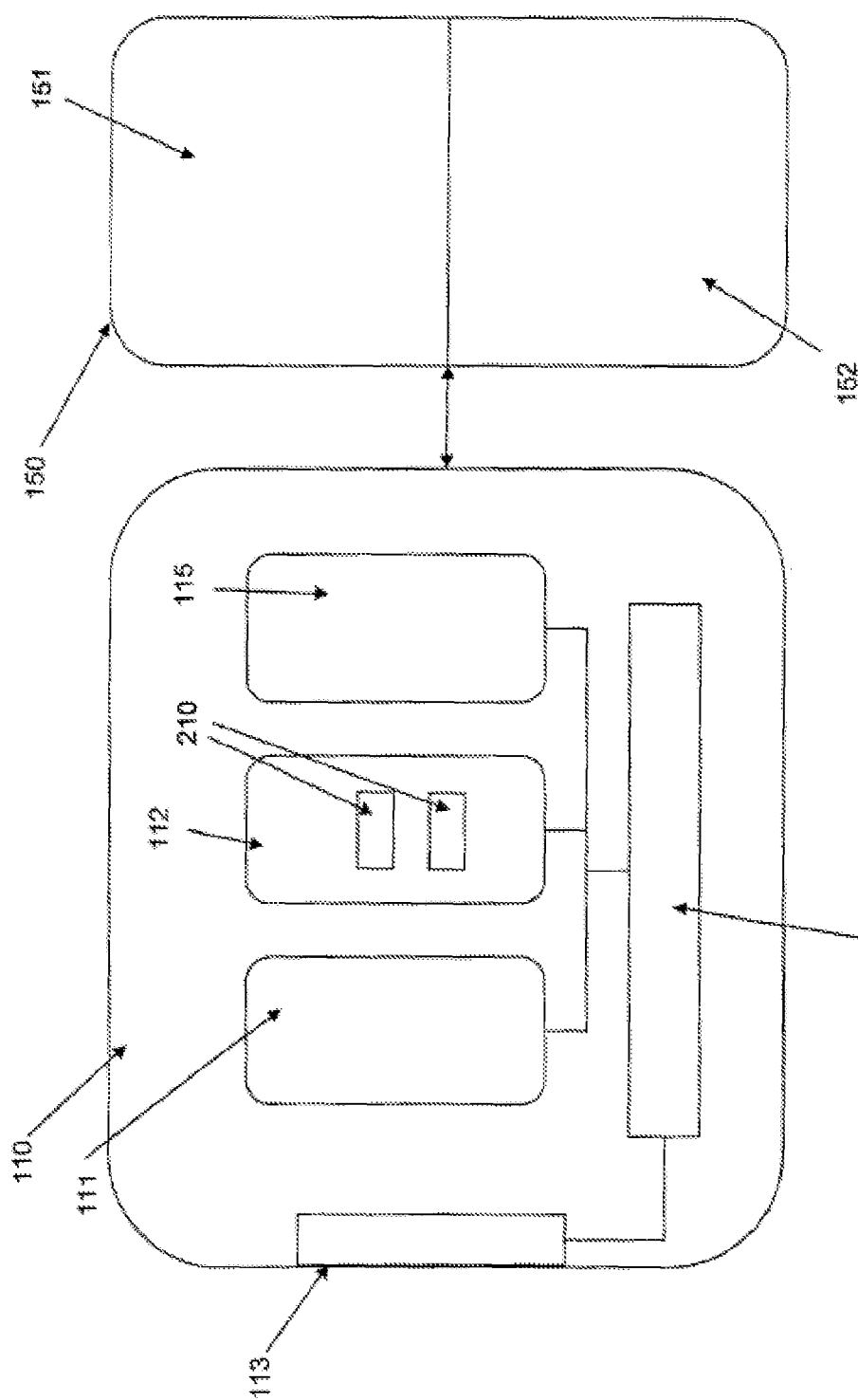
FIG. 2 depicts in greater detail the structure and operation of server.

FIG. 2 depicts in greater detail the structure and operation of server 100. Server 100 comprises publishing component 110 and content server component 150. Publishing component comprises database 111, import queue 112, content toolset interface 113, user interface 114 & catalogue 115. In operation, the publishing component receives content from the content toolset at the content toolset interface. The content is presented in the form of a parcel 210a, 210b, . . . , (see below) comprising one or more Trigs and one or more Triglets. A trig is a user interface for a mobile device, such as a mobile telephone and a triglet is a data file that can be used to extend or alter a trig. If a parcel comprises more than one trig then one of the Trigs may be a master trig from which the other Trigs are derived.

The publishing component user interface 114 can be used to import a parcel into the database 111, and this process causes references to each trig and triglet to be loaded into the import queue 114, which may comprise references to a plurality of parcels 210a, 210b, . . . . The contents of the parcel may be examined using the user interface and the contents of the parcel can be passed to the catalogue.

The MNO may have several publishing domains, for example one for each target server in a number of countries or regions. Each domain is treated in isolation from other domains and has its own publishing scheme describing how objects are to be published onto content servers in both live and staging environments. The publishing component GUI provides several different views to each domain, enabling operators to completely manage the publishing of content. The catalogue comprises references to the Trigs stored in the catalogue and the update channels and feed channels used to transfer content to the various domains. For each domain, the operator uses the publishing component GUI to set up the domain structure and allocate trigs from the catalogue to each domain node. To aid the operator in selecting trigs efficiently, a filter is provided in the catalogue so that only relevant items are shown.

The content server component 150 is a standard implementation of a web server and as such the scaling model is well understood. The capabilities of a server can be rated using a "SPECweb99" number indicating the number of concurrent sessions that the web server can handle under benchmark conditions. Published SPECweb99 numbers range from 404 to 21,000 with typical commercial web servers having SPECweb99 numbers in the order of 5,000. A typical deployment scenario of 1 m subscribers with hourly updating content requires a web server with a SPECweb99 rating of only 1,112. A successful deployment will lead to increased service use which can be provided for by enabling additional servers to create an infrastructure that can be both scalable and highly resilient to failure.

A connection may be made to the server from a mobile device via a WAP Gateway. In this case the web server session exists between the WAP gateway and the web server, rather than the mobile phone and web server. When a request is made for a file via the WAP gateway, the session with the web server lasts only as long as it takes to transfer the file from the web server to the WAP gateway—i.e. the session is extremely short since the connection bandwidth will be very high and latency extremely low.

Alternatively a direct connection may be established between the mobile phone and the web server. In this case, the web server will need to keep the session open for as long as it takes to download the data to the phone.

There are two types of content that are delivered by the content server component: trigs, typically of the order of 100 KB and regularly updating triglets which are typically of the order of 1 KB. The traffic created by trig downloads is very similar to the traffic generated by existing content downloads. And thus the related issues are well understood. Downloads of regular triglet updates are a new feature in an MNO's traffic model but because of the small size of the updates, which typically fit within one data packet, it is possible to show that the traffic can still be handled by typical web servers.

In the case of a triglet download, typically only one data packet is required to transfer 1 KB. Assuming a round-trip latency across a GPRS network of 2 seconds, the web server will need to hold open a typical session for around 4 seconds. For the scenario of 1 million subscribers having a trig on their phone with content that updates every hour, this implies 278 hits per second on the web server and 1,112 concurrent sessions. As stated earlier, this number is well within the capability of typical web servers.

Figure 3:
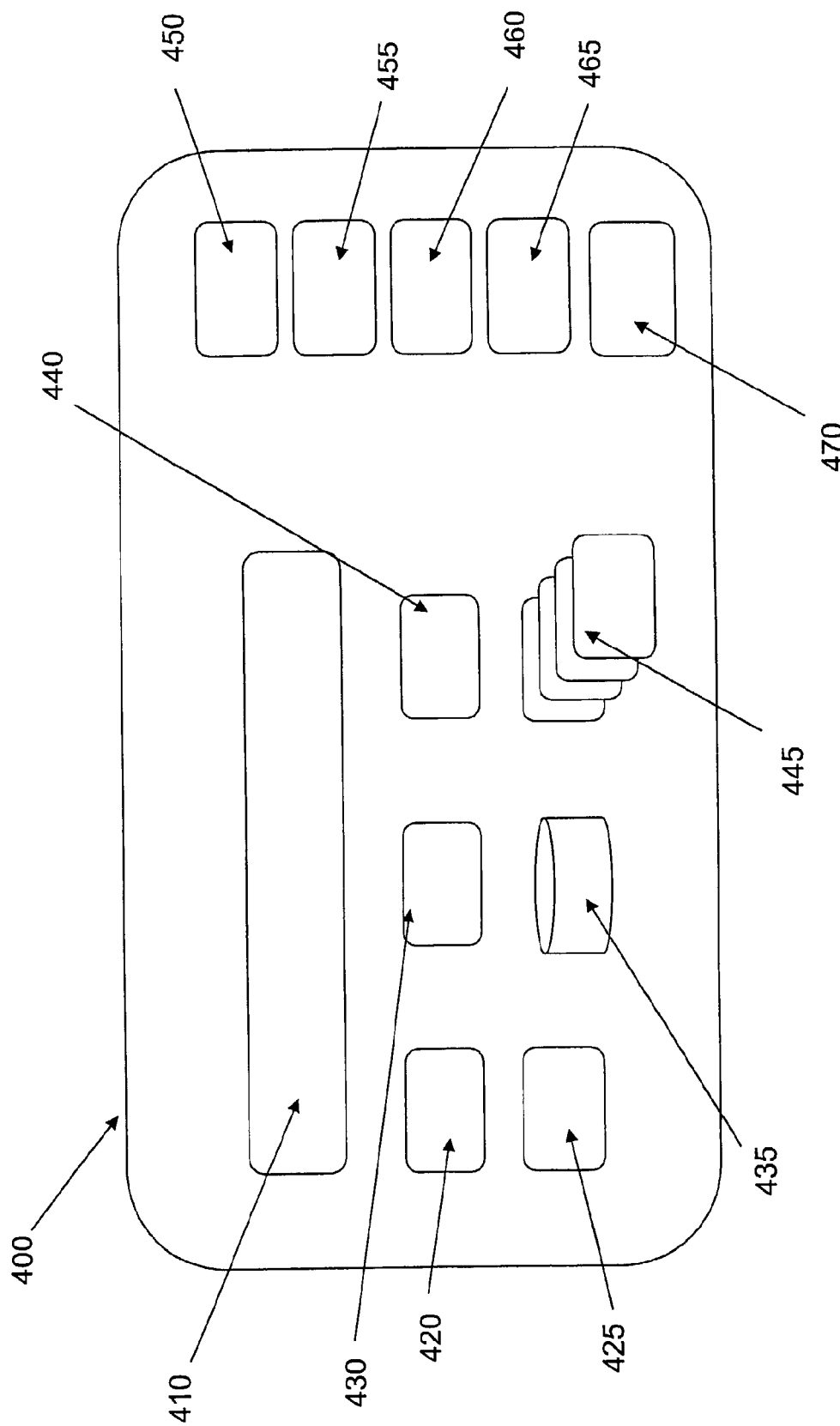
FIG. 3 shows a schematic depiction of the software for the mobile devices.

FIG. 3 shows a schematic depiction of the software 400 for the mobile devices 300, which comprises a mark-up language renderer 410, update manager 420, network communication agent 425, resource manager 430, virtual file system 435, actor manager 440, a plurality of actors 445a, 445, . . . , native UI renderer 450, support manager 460, trig manager 465 and mark-up language parser 470.

It is preferred that the software operates using TrigML, which is an XML application and that mark-up language renderer 410 renders the TrigXML code for display on the mobile device 300. The mark-up language renderer also uses the TrigML Parser to parse TrigML resources, display content on the device screen and controlling the replacement and viewing of content on the handset. The native UI renderer is used to display UI components that can be displayed without the use of TrigML, and for displaying error messages.

The software 400 is provisioned and installed in a device specific manner. For example for a Nokia Series 60 device the software is installed using a SIS file, whereas for a MS Smartphone device the software is installed using a CAB file. Similarly, software upgrades are handled in a device specific manner. The software may be provisioned in a more limited format, as a self-contained application that renders its built in content only: i.e. the software is provisioned with a built-in trig but additional trigs cannot be added later. The supplied trig may be upgraded over the air.

The trig manager 465 presents an interface to the resource manager 430 and the mark-up language renderer. It is responsible for trig management in general. This includes: persisting knowledge of the trig in use, changing the current trig, selection of a trig on start-up, selection of a further trig as a fall back for a corrupt trig, maintaining the set of installed trigs, identifying where a particular trig is installed to the resource manager and reading the update channel definitions of a trig and configuring the update manager appropriately.

The resource manager provides an abstraction of the persistent store on device, i.e. storing the files as real files, or as records in a database. The resource manager presents a file system interface to the mark-up language renderer and the update manager. It is responsible for handling file path logic, distinguishing between real resource files and actor attributes, mapping trig-relative paths onto absolute paths, interfacing with the trig manager and providing a modification interface to the update manager.

The Update Manager handles the reception and application of Trigs and Triglets. The Update Manager presents an interface to the Renderer and the trig Manager and is responsible for: the initiation of manual updates when instructed to by the Renderer; controlling and implementing the automatic update channel when so configured by the trig manager; indicating the progress of a manual update and recovering an Update following unexpected loss of network connection and/or device power. The update packet format may be defined as a binary serialisation of an XML schema.

The Support Manager provides an interface for other components to report the occurrence of an event or error. Depending on the severity of the error, the Support Manager will log the event and/or put up an error message popup XML is a convenient data formatting language that is used to define the update packet format as well as TrigML content. For bandwidth and storage efficiency reasons, text XML is serialised into a binary representation. Both update packets and TrigML fragments are parsed by the same component, the mark-up language parser. Any further use of XML in the software must use the binary XML encoding and therefore re-use the parser.

The Actor Manager 440 looks after the set of actors 445 present in the software. It is used by: the renderer when content is sending events to an actor; actors that want to notify that an attribute value has changed and actors that want to emit an event (see below).

The software may comprise a multi-threaded application running a minimum of two threads, with more possible depending on how many and what sort of actors are included. The software runs mostly in one thread, referred to as the main thread. The main thread is used to run the renderer which communicates synchronously with other components. Actors always have a synchronous interface to the Renderer. If an actor requires additional threads for its functionality, then it is the responsibility of the Actor to manage the inter-thread communication. It is preferred that a light messaging framework is used to avoid unnecessary code duplication where many actors require inter-thread communication.

In addition to the main thread, the update manager runs a network thread. The network thread is used to download update packets and is separate from the main thread to allow the renderer to continue unaffected until the packet has arrived. The Update Manager is responsible for handling inter-thread messaging such that the Update Manager communicates synchronously with the Renderer and Resource Manager when applying the changes defined in an Update Packet.

The Renderer receives information regarding the key press. If there is no behaviour configured at build time for a key, it is sent as a TrigML content event to the current focus element. The content event is then handled as defined by TrigML's normal event processing logic.

For example, if a key is pressed down, a 'keypress' event is delivered to the Renderer with a parameter set to they relevant key. When the key is released, a '!keypress' event is delivered to the Renderer. If a key is held down for a extended period of time, a 'longkeypress' event is delivered to the renderer. On release, both a '!longkeypress' and a '!keypress' event are delivered to the Renderer.

A trig is started by loading the defined resource name, start-up/default. The TrigML defined in start-up/default is parsed as the new contents for the content root node.

The first time a trig is run by the software following its installation, the trig is started by loading the resource name startup/firsttime. The software may record whether a trig has been run or not in a file located in the top level folder for that trig. Dependent on the platform used by the mobile device, the automatic start-up of the software may be set as a build-time configuration option. Furthermore, placing the software in the background following an auto-start may also be a build-time configuration option.

A launcher may appear to the user as an application icon and selecting it starts the software with a trig specified by that launcher (this trig may be indicated by a launcher icon and/or name). When using a launcher to start a trig, it is possible to specify an 'entry point' parameter. The parameter is a resource name of a file found in the 'start-up' folder. This file is not used if the trig has never been run before, in which case the file called 'firsttime' is used instead.

The software uses content resource files stored in a virtual file system on the device. The file system is described as virtual as it may not be implemented as a classical file-system, however, all references to resources are file paths as if stored in a hierarchical system of folders and files. Furthermore, the software stores some or all of the following information: usage statistics; active user counts; TrigManager state; TrigML fragments & update channel definition (serialised as binary XML); PNG images; plain text, encoded as UTF-8 OTA and then stored in a platform specific encoding; other platform specific resources, e.g. ring tone files, background images, etc.

Files in the file system can be changed, either when an actor attribute value changes, or when a file is replaced by a triglet. When files in the /attrs directory change, the Renderer is immediately notified and the relevant branches of the content tree are updated and refreshed. When images and text resources are changed, the Renderer behaves as if the affected resources are immediately reloaded (either the whole content tree or just the affected branches may be refreshed). When TrigML fragments are changed, the Renderer behaves as if it is not notified and continues to display its current, possibly out of date, content. This is to avoid the software needing to persist <include> elements and the <load> history of the current content.

The software 400 is provisioned to mobile devices in a device specific method. One or more Trigs can be provisioned as part of the installation, for example, stored as an uncompressed update packet. On start-up, the packet can be expanded and installed to the file-system.

The Actors 445 are components that publish attribute values and handle and emit events. Actors communicate with the Renderer synchronously. If an actor needs asynchronous behaviour, then it is the responsibility of the actor to manage and communicate with a thread external to the main thread of the Renderer. An Actor can be messaged by sending it an event with the <throw> element. Events emitted by actors can be delivered to the content tree as content events: these can be targeted at an element Id or 'top'. The interface to an actor is defined by an Actor Interface Definition file. This is an XML document that defines the attributes, types, fieldnames, events-in and parameters, and events out. The set of actors is configurable at build-time for the software.

For commercial reasons it is desirable for MNOs and/or content providers to be able to have some control over the user interface that will be displayed on the screen of a mobile device. It is also important that there is a degree of flexibility that allows users to download triglets or new trigs to modify the appearance of their device and also to make further changes to the displayed image that is determined by the trig or triglet in use.

Content for the user interface is stored in archive files and the UI of an app can be defined by one or more archive files. Each archive file may contain multiple resources (mark-up elements, images, text etc). The files within the archive are, like other archive file formats, stored in a tree structure, in a manner similar to a known folder/file structure. Where more than one archive file is used to define a UI, the required archive files are arranged in a strict sequence (or list). When a resource is required it is searched for in each archive file, the search returning the first file found.

It is possible to order the archive files in such a manner that resources extracted from an archive file earlier in the list mask resources found in an archive file (or files) which are found lower down in the list of archive files. For example, if there is a requirement to temporarily obscure an element of the UI, for example a window, then a mask element can be defined in an archive file which is stored at a higher level than the archive file that comprises the UI element to be obscured.

It should be noted that when the user interface content is interpreted to render the UI, the addition of an obscuring element causes the obscuring element to be rendered within the UI. As the obscuring element and the UI element to be masked occupy a common region of the UI and the obscuring element is held within an archive file which is a higher layer than the archive file that comprises the element to be masked, only the obscuring element is to be shown in the UI and thus only the obscuring element is fetched by the renderer in order to render the UI. Because the obscuring element is to be rendered and it occupies the same position as the element to be masked, the element to be masked is not fetched the renderer. This approach reduces the amount of data that is fetched by the renderer in order to render the UI and thus reduces the amount of processing power that is required to render the UI and decreases the time that is taken to render the UI.

This method is of significant use where an archive file is needed by more than one application on a device (such an archive file may be referred to as the common archive or base archive). Each application can then supply their own application-specific archive file that masks some of the resources in the common archive file and adds further resources that are required. Each application has a list of archive file(s) that it uses, but some of these archive files will be used by other applications as well. This can be thought of as a hierarchy of archive files: the common archive files are at the top layer of the hierarchy, with the application-specific archive files comprising the lower layers of the hierarchy. Archive files specific to an application may be referred to as flat files, as the different archive files are to be found in the same layer of the hierarchy.

According to a further embodiment the above arrangement may be extended to allow the configuration and appearance of the UI to be controlled. For example, as the UI is effectively formed from the interaction of the elements that are stored in archive files that are associated with different layers of the hierarchy, it is possible to assign one or more layers of the hierarchy to different entities, such as the MNO, device manufacturer, trig provider, the device user, etc. This allocation of the different layers of the hierarchy, for example, enables a logo associated with the device manufacturer to be permanently displayed within the UI by assigning the top layer of the hierarchy to the manufacturer. If the network operator, or a trig provider, wishes to publicise a time-limited promotional offer then a suitable element can be added to an archive file in a layer associated with the network operator. The entity that is allocated the lowest level(s) of the hierarchy is able to change and modify all of the UI elements that have not been defined in archive files in any of the higher levels of the hierarchy.

Figure 4:
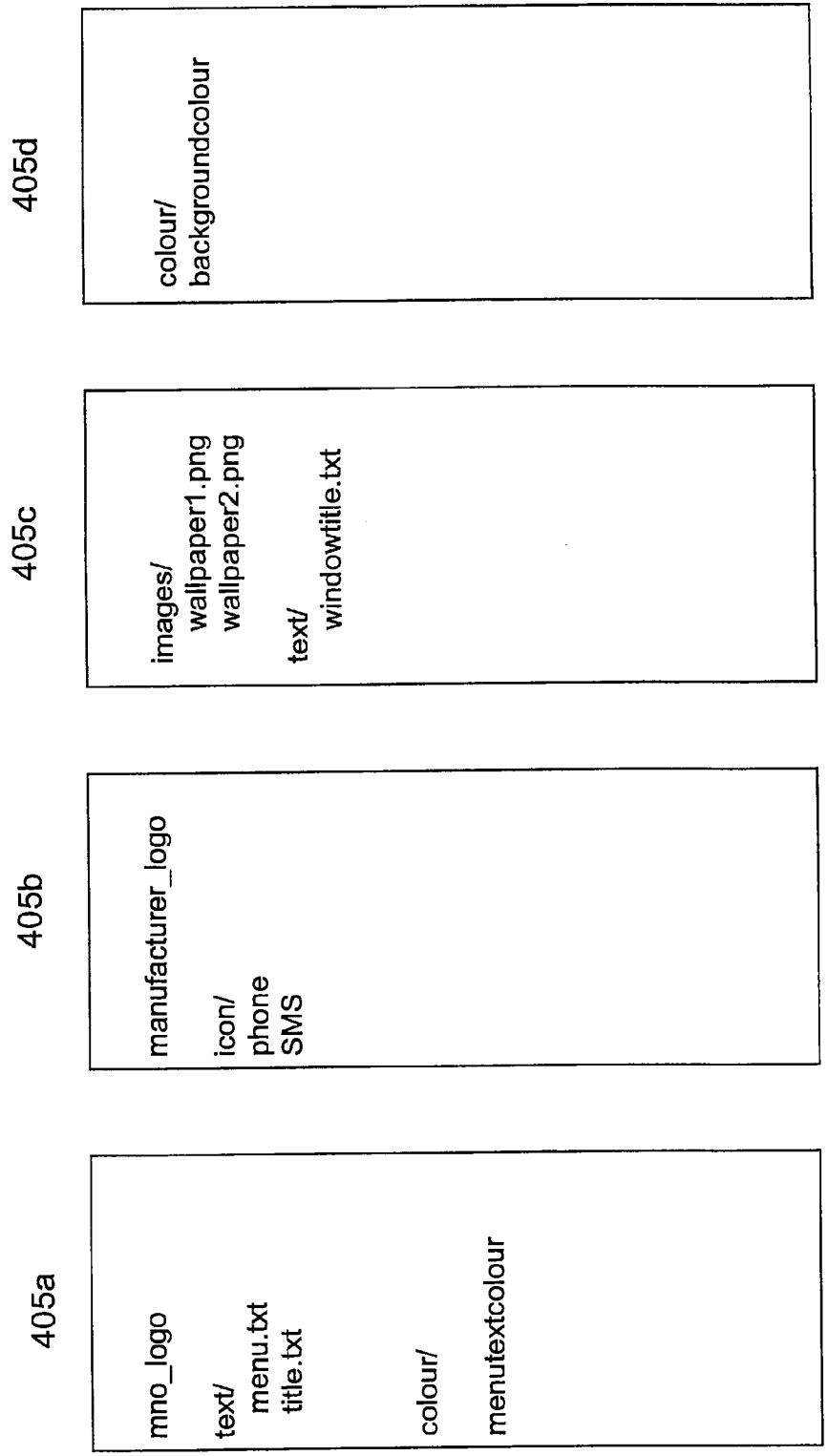
FIG. 4 shows a schematic depiction of four hierarchical planes.

FIG. 4 shows a schematic depiction of four hierarchical planes 405a-d: plane 405a comprises UI elements defined buy the MNO; plane 405b comprises UI elements defined buy the device manufacturer; plane 405c comprises UI elements defined by a trig; and plane 405d comprises UI elements defined by the user. Plane 405a has the highest position in the hierarchy and plane 405d has the lowest position in the hierarchy. For example, the mno_logo element in plane 405a defines the graphic element used and its position on the display screen of the device. As it is in the highest plane of the hierarchy it will always appear and will take preference over any other UI element in a lower hierarchy element that attempts to use the pixels used by mno_logo. Plane 405d comprises the backgroundcolour element, which is not defined in any of the other planes and thus the colour defined in backgroundcolour will be used in the UI.

Plane 405c comprises the windowtitle.txt element that defines the attributes for the text used in the title of a window. This may be overwritten by adding a windowtitle.txt element to either plane 405a or 405b to define the text attributes, or by adding a windowtitle.txt_deleted element to either plane 405a or 405b to instruct the UI renderer to ignore any subsequent windowtitle.txt element.

This enables each feature of the UI to be configurable but also provides a framework within which certain UI elements can be defined by an entity, such as the network operator, in a manner that prevents other entities from altering or interfering with those defined UI element(s).

Although the preceding discussion has referred to user interface content being stored within archive files, it will be readily understood that the user interface content may alternatively be stored in other forms that provide a collection of files, for example, a folder of unpacked files, or a folder comprising unpacked files and other folders.

In conventional mobile devices, information regarding the battery strength, signal strength, new text messages, etc. are shown to the user. Typically this information is obtained by the operating system sending a call to the relevant hardware or software entity and the UI interpreting the received answer and displaying it.

This information may be displayed in the UI using a TrigML tag (see below) <phonestatus> (or <signalstrength>). Rendering this tag causes a listening query to be opened to the relevant hardware or software entity. If a change in state occurs then the UI renderer is notified and the UI renderer loads the relevant icon or graphic to communicate the change in state to the user. If the user changes the view within the UI the tag may be withdrawn and the listening query is terminated. This approach is more resource efficient as the listening query is only active when the tag is in use.

TrigML can use constant variables instead of attribute values. Constant variables are accessed with the same syntax as <include> parameters, e.g. $background_colour. Constants are treated as global variables in a trig and are defined in the reserved folder, constants/. The variable definitions contained in the files in the constants/folder may be resolved at compile time with direct substitution of their values. In an alternative embodiment the variable definitions in constants/ are compiled as global variables and resolved at content parse time by the software. This allows the trig to be updated by a simple replacement of one or all of its constants files.

A System String Dictionary defines the integer values to use for all well known strings, i.e. reserved words. These have several types, including: TrigML element and attribute names ('group', 'res', 'layer', 'image', 'x'), TrigML attribute values (e.g.: 'left', 'activate', 'focus') and common resource paths (e.g.: 'attr', 'start-up', 'default'). As an input, the String Dictionary is optional. The first time a trig is compiled it will not have a String Dictionary. This first compilation creates the String Dictionary, which is then used for all future compilations of that trig. Triglet compilation must have a String Dictionary that defines all the string mappings used by the trig it is modifying.

In order to successfully render the user interface of a mobile device, the mark-up language must have the following qualities: concise page definitions, consistent layout rules, be implementable in a compact renderer, provide multiple layering and arbitrary overlapping content, event model, require the repaint of only the areas of the display that have to change between pages of the UI, include hooks to the platform for reading property values receiving events and sending events, extensible, and be graphically flexible. TrigML provides these features and an overview of the elements and attributes that provide the desired functionality can be found in our co-pending application GB0403709.9, filed Feb. 19, 2004.

It is desirable that the cost of re-branding UIs and producing a continual stream of updates is minimal. This is enabled by providing an efficient flow of information from the creative process through to the transmission of data to users.

A container, referred to as a parcel, is used for UIs, UI updates, and templates for 3rd party involvement. Parcels contain all the information necessary for a 3rd party to produce, test and deliver branded UIs and updates. FIG. 5 shows a schematic depiction of the content toolset 200, which comprises scripting environment 220, test and simulation environment 230 and maintenance environment 240

The parcel process comprise five processing stages:
1) The scripting environment 220 provides the means to design the template for one or more UIs and the update strategy for UIs based on that template.
2) The maintenance environment 240 provides for rapid UI and update production in a well-controlled and guided environment that can be outsourced to content providers.
3) The maintenance environment 240 'pre-flight' functionality allows the deployment administrator to check and tune the UIs and updates that they receive from 3rd parties.
4) The publishing component 110 provides management of UIs and updates at the deployment point, including the staging of new releases.
5) The publishing component 110 enables the automatic generation of updates from live content feeds.

In a typical project, parcels are created within the scripting environment 220 for: a content provider to create re-branded UIs from a template, incorporating the same 'feel' but a different 'look'; a content provider to create updates from a template, that provide a periodic, or user selected variation to UI content; or an ad agency to create updates from a template that promote new services on a periodic basis.

For all of these use cases, maintenance environment 240 is used to import the parcel, re-brand and reconfigure the content and create a new parcel for submission to the publishing component 110. In the design of the UI template, the following issues should be considered: which part of the UI can be re-banded; which features of a UI need to be reconfigured at re-branding or remotely; which part of the UI content may be updated; and if the UI is re-branded then can user select content feeds in use. The scripting environment 220 allows these strategies to be defined, and enables the maintenance environment 240 as the implementer of each instance of each strategy.

A parcel is generated by the scripting environment 220 which comprises a template UI or update for editing. Once editing is complete the parcel is saved in an 'outbox' ready for despatch to the maintenance environment 240 for publishing to the content server. The following 'parcel' functions are provided. The maintenance environment 240 can be used to edit/replace resources held within the parcel. Parcels can be exported to the simulation environment to test the performance of the UI or UI update on a mobile device.

A parcel entry may be double clicked to launch an appropriate editor. (for example, an image resource would launch an image editor). All resources may have a text description/note inserted in the maintenance environment and displayed in the appropriate context in the maintenance environment. Lists of menu entries are handled as a special resource type with each entry presenting its own sub-catalogue of resources (for example—title, help string, image, roll-over image, URL and ringtone preview).

Many different UIs can be derived from a common base. Typically the common base would implement most of the interface itself, and Trigs derived from it would implement small variations on it, such as branding. A Triglet can be derived from a Trig, and it can override any of the resources from the parent Trig that it chooses to (optionally it may introduce its own resources). Note that "resources" here also refers to TrigML, so the behaviour and layout of a Trig can be modified by a Triglet just as easily as it replacing a single image or piece of text.

A Parcel may comprise one or more base Trigs (i.e. a Trig that is not derived from any other trig), one or more multiple Trigs derived from a base Trig, a plurality of triglets derived from any of the trigs and a plurality of triglets derived from other triglets.

FIG. 5 shows a schematic depiction of a device 800 that comprises a user interface according to an embodiment of the present invention. The device comprises a display 810 that displays the user interface 815 and user interface means 820, that enable the user to interact with the user interface 815. A processor 830 executes the software that is stored within one or more storage means 840 and there may be provided one or more wireless communication interfaces 850, to enable communication with other devices and/or communication networks. One or more batteries 860 may be received to power the device, which may also comprise interfaces to receive electrical power and/or communication cables.

The nature of these components and interfaces will depend upon the nature of the device. It will be understood that such a user interface can be implemented within a mobile or cellular telephone handset, but it is also applicable to other portable devices such as digital cameras, personal digital organisers, digital music players, GPS navigators, portable gaming consoles, etc. Furthermore, it is also applicable to other devices that comprise a user interface, such as laptop or desktop computers.

The user interface means may comprise a plurality of buttons, such as a numerical or alpha-numerical keyboard, or a touch screen or similar. One or more storage devices may comprise a form of non-volatile memory, such as a memory card, so that the stored data is not lost if power is lost. ROM storage means may be provided to store data which does not need updating or changing. Some RAM may be provided for temporary storage as the faster response times support the caching of frequently accessed data. The device may also accept user removable memory cards and optionally hard disk drives may be used as a storage means. The storage means used will be determined by balancing the different requirements of device size, power consumption, the volume of storage required, etc.

Such a device may be implemented in conjunction with virtually any wireless communications network, for example second generation digital mobile telephone networks (i.e. GSM, D-AMPS), so-called 2.5G networks (i.e. GPRS, HSCSD, EDGE), third generation WCDMA or CDMA-2000 networks and improvements to and derivatives of these and similar networks. Within buildings and campuses other technologies such as Bluetooth, IrDa or wireless LANs (whether based on radio or optical systems) may also be used. USB and/or FireWire connectivity may be supplied for data synchronisation with other devices and/or for battery charging.

Computer software for implementing the methods and/or for configuring a device as described above may be provided on data carriers such as floppy disks, CD-ROMS. DVDs, non-volatile memory cards, etc.

This application claims the benefit of UK Patent Application number 0403709.9, filed Feb. 19, 2004, the contents of which are incorporated herein by reference.

The invention claimed is:

1. A method for rendering user interface elements on a display, the method comprising:
    storing one or more user interface elements in each of a plurality of archive files, wherein at least one of the one or more user interface elements comprises an obscuring element;
    defining an archive file hierarchy, wherein the archive file hierarchy includes the plurality of archive files and each of the plurality of archive files has a position in the archive file hierarchy in a range between a highest position and a lowest position;
    fetching each of the one or more user interface elements to be rendered based on a position in the archive file hierarchy of a respective archive file in which each of the one or more user elements is stored, beginning with the archive file at the highest position, wherein user interface elements that are located in more than one archive file are only fetched from the highest position archive file; and
    rendering each of the fetched one or more user interface elements on the display.

2. The method of claim 1, wherein the obscuring element is stored in a first archive file and masks a user element in a second archive file, wherein the obscuring element is fetched from the first archive file and rendered on the display and the masked user element is not fetched from the second archive file.

3. The method of claim 1, wherein the plurality of archive files comprise at least one common archive file used by a plurality of applications and a plurality of application-specific archive files.

4. The method of claim 1, wherein the one or more user interface elements are defined by a mobile network operator, a device manufacturer, a trig, a user, or a combination thereof.

5. The method of claim 1, wherein archive files containing the one or more user interface elements are prioritized in the following order from highest to lowest: mobile network operator defined, device manufacturer defined, trig defined, and user defined.

6. The method of claim 1, further comprising:
    defining a windowtitle.txt element in one or more archive files.

7. The method of claim 6, wherein the windowtitle.txt element defines one or more attributes for text used in a title of a window to be rendered at a display.

8. The method of claim 6, further comprising:
    displaying text associated with a windowtitle.txt element stored in an archive file having a highest position in the archive file hierarchy unless an archive file not associated with a windowtitle.txt element and having a higher position in the archive file hierarchy than the archive file containing the windowtitle.txt element includes an instruction to ignore any windowtitle.txt elements associated with lower archive files.

9. The method of claim 1, further comprising:
    defining the obscuring element to mask a user interface element that occupies a common region of a display.

10. The method of claim 9, wherein the obscuring element is stored within the first archive file having a higher position in the archive file hierarchy than the second archive file in which the masked user interface element is located.

11. A computer system for rendering user interface elements on a display, the system comprising:
    a processor operable for:
        storing one or more user interface elements in each of a plurality of archive files, wherein at least one of the one or more user interface elements comprises an obscuring element;
        defining an archive file hierarchy, wherein the archive file hierarchy includes the plurality of archive files and each of the plurality of archive files has a position in the archive file hierarchy in a range between a highest position and a lowest position;
        fetching each of the one or more user interface elements to be rendered based on a position in the archive file hierarchy of a respective archive file in which each of the one or more user elements is stored, beginning with the archive file at the highest position, wherein user interface elements that are located in more than one archive file are only fetched from the highest position archive files; and
        rendering each of the fetched one or more user interface elements on the display.

12. The system of claim 11, wherein the obscuring element is stored in a first archive file and masks a user element in a second archive file, wherein the obscuring element is fetched from the first archive file and rendered on the display and the masked user element is not fetched from the second archive file.

13. The system of claim 11, wherein the plurality of archive files comprise at least one common archive file used by a plurality of applications and a plurality of application-specific archive files.

14. The system of claim 11, wherein the one or more user interface elements are defined by a mobile network operator, a device manufacturer, a trig, a user, or a combination thereof.

15. The system of claim 11, wherein archive files containing the one or more user interface elements are prioritized in the following order from highest to lowest: mobile network operator defined, device manufacturer defined, trig defined, and user defined.

16. The system of claim 11, wherein the processor is further operable for:
    defining a windowtitle.txt element in one or more archive files.

17. The system of claim 16, wherein the windowtitle.txt element defines one or more attributes for text used in a title of a window to be rendered at a display.

18. The system of claim 16, wherein the processor is further operable for:
    displaying text associated with a windowtitle.txt element stored in an archive file having a highest position in the archive file hierarchy unless an archive file not associated with a windowtitle.txt element and having a higher position in the archive file hierarchy than the archive file containing the windowtitle.txt element includes an instruction to ignore any windowtitle.txt elements associated with lower archive files.

19. The system of claim 11, wherein the processor is further operable for:
defining the obscuring element to mask a user interface element that occupies a common region of a display.

20. The system of claim 19, wherein the obscuring element is stored within the first archive file having a higher position in the archive file hierarchy than the second archive file in which the masked user interface element is located.

21. A computer system for rendering user interface elements on a display, the system comprising:
means for storing one or more user interface elements in each a plurality of archive files, wherein at least one of the one or more user interface elements comprises an obscuring element;
means for defining an archive file hierarchy, wherein the archive file hierarchy includes the plurality of archive files and each of the plurality of archive files has a position in the archive file hierarchy in a range between a highest position and a lowest position;
means for fetching each of the one or more user interface elements to be rendered based on a position in the archive file hierarchy of a respective archive file in which each of the one or more user elements is stored, beginning with the archive file at the highest position, wherein user interface elements that are located in more than one archive file are only fetched from the highest position archive file; and
means for rendering each of the fetched one or more user interface elements on the display.

22. The system of claim 21, wherein the obscuring element is stored in a first archive file and masks a user element in a second archive file, and the obscuring element is fetched from the first archive file and rendered on the display and the masked user element is not fetched from the second archive file.

23. The system of claim 21, wherein the plurality of archive files comprise at least one common archive file used by a plurality of applications and a plurality of application-specific archive files.

24. The system of claim 21, wherein the one or more user interface elements are defined by a mobile network operator, a device manufacturer, a trig, a user, or a combination thereof.

25. The system of claim 21, wherein archive files containing the one or more user interface elements are prioritized in the following order from highest to lowest: mobile network operator defined, device manufacturer defined, trig defined, and user defined.

26. The method of claim 21, further comprising defining a windowtitle.txt element in one or more archive files.

27. The system of claim 26, wherein the windowtitle.txt element defines one or more attributes for text used in a title of a window to be rendered at a display.

28. The system of claim 26, further comprising:
means for displaying text associated with a windowtitle.txt element stored in an archive file having a highest position in the archive file hierarchy unless an archive file not associated with a windowtitle.txt element and having a higher position in the archive file hierarchy than the archive file containing the windowtitle.txt element includes an instruction to ignore any windowtitle.txt elements associated with lower archive files.

29. The system of claim 21, further comprising:
means for defining the obscuring element to mask a user interface element that occupies a common region of a display.

30. The system of claim 21, wherein the obscuring element is stored within the first archive file having a higher position in the archive file hierarchy than the second archive file in which the masked user interface element is located.

31. A computer program product comprising a non-transitory computer usable medium having a computer readable program code embodied therein, said computer readable program code adapted to be executed to implement a method for rendering user interface elements on a display, said method comprising:
storing one or more user interface elements in each a plurality of archive files, wherein at least one of the one or more user interface elements comprises an obscuring element;
defining an archive file hierarchy, wherein the archive file hierarchy includes the plurality of archive files and each of the plurality of archive files has a position in the archive file hierarchy in a range between a highest position and a lowest position;
fetching each of the one or more user interface elements to be rendered based on a position in the archive file hierarchy of a respective archive file in which each of the one or more user elements is stored, beginning with the archive file at the highest position, wherein user interface elements that are located in more than one archive file are only fetched from the highest position archive file; and
rendering each of the fetched one or more user interface elements on the display.

32. The computer program product of claim 31, wherein the program code implementing the method further comprises:
defining the obscuring element in a first archive file to mask a user element in a second archive file, wherein the obscuring element is fetched from the first archive file and rendered on the display and the masked user element is not fetched from the second archive file.

33. The computer program product of claim 31, wherein the plurality of archive files comprise at least one common archive file used by a plurality of applications and a plurality of application-specific archive files.

34. The computer program product of claim 31, wherein the one or more user interface elements are defined by a mobile network operator, a device manufacturer, a trig, a user, or a combination thereof.

35. The computer program product of claim 31, wherein archive files containing the one or more user interface elements are prioritized in the following order from highest to lowest: mobile network operator defined, device manufacturer defined, trig defined, and user defined.

36. The computer program product of claim 31, wherein the program code implementing the method further comprises:
defining a windowtitle.txt element in one or more archive files.

37. The computer program product of claim 36, wherein the windowtitle.txt element defines one or more attributes for text used in a title of a window to be rendered at a display.

38. The computer program product of claim 31, wherein the program code implementing the method further comprises:
displaying text associated with a windowtitle.txt element stored in an archive file having a highest position in the archive file hierarchy unless an archive file not associated with a windowtitle.txt element and having a higher position in the archive file hierarchy than the archive file containing the windowtitle.txt element includes an instruction to ignore any windowtitle.txt elements associated with lower archive files.

39. The computer program product of claim 31, wherein the program code implementing the method further comprises:
defining the obscuring element to mask a user interface element that occupies a common region of a display.

40. The computer program product of claim 31, wherein the obscuring element is stored within the first archive file having a higher position in the archive file hierarchy than the second archive file in which the masked user interface element is located.

* * * * *